United States Patent
Raisigel et al.

(10) Patent No.: US 8,981,911 B2
(45) Date of Patent: Mar. 17, 2015

(54) WIRELESS DETECTION DEVICE

(75) Inventors: Hynek Raisigel, Sassenage (FR); Eric Leger, Chapareillan (FR)

(73) Assignee: Schneider Electric Industries SAS, Rueil Malmaison (FR)

(*) Notice: Subject to any disclaimer, the term of this patent is extended or adjusted under 35 U.S.C. 154(b) by 143 days.

(21) Appl. No.: 13/617,650

(22) Filed: Sep. 14, 2012

(65) Prior Publication Data

US 2013/0099904 A1 Apr. 25, 2013

(30) Foreign Application Priority Data

Oct. 20, 2011 (FR) .................................... 11 59517

(51) Int. Cl.
*G08C 19/16* (2006.01)
*H05B 37/02* (2006.01)

(52) U.S. Cl.
CPC ........ *H05B 37/0218* (2013.01); *H05B 37/0227* (2013.01); *H05B 37/0272* (2013.01); *Y02B 20/46* (2013.01)
USPC ..................... 340/12.22; 340/509; 340/539.1; 340/539.22; 340/541; 315/159; 315/149; 315/150

(58) Field of Classification Search
CPC ........... H05B 37/0218; H05B 37/0227; H05B 37/0272
USPC .............. 340/12.22, 509, 539.1, 539.22, 541; 315/159, 149, 150
See application file for complete search history.

(56) References Cited

U.S. PATENT DOCUMENTS

| | | | |
|---|---|---|---|
| 5,455,487 A | 10/1995 | Mix et al. | |
| 6,891,469 B2 * | 5/2005 | Engellenner | 340/505 |
| 8,354,793 B2 * | 1/2013 | Cash et al. | 315/150 |
| 8,638,036 B2 * | 1/2014 | Delnoij | 315/158 |
| 2004/0206609 A1 | 10/2004 | Tilley | |
| 2008/0272826 A1 * | 11/2008 | Smit et al. | 327/509 |
| 2008/0272827 A1 | 11/2008 | Smit et al. | |
| 2008/0272835 A1 | 11/2008 | Smit et al. | |
| 2008/0272836 A1 | 11/2008 | Smit et al. | |
| 2010/0244709 A1 | 9/2010 | Steiner et al. | |
| 2010/0270982 A1 | 10/2010 | Hausman, Jr. et al. | |
| 2011/0043035 A1 * | 2/2011 | Yamada et al. | 307/39 |
| 2011/0298379 A1 * | 12/2011 | Jung et al. | 315/149 |
| 2012/0074852 A1 | 3/2012 | Delnoij | |

FOREIGN PATENT DOCUMENTS

| | | |
|---|---|---|
| WO | 2010/111256 A2 | 9/2010 |
| WO | 2010/140094 A1 | 12/2010 |

OTHER PUBLICATIONS

French Preliminary Search Report and Written Opinion of the International Searching Authority issued Jul. 30, 2012, in Patent Application No. FR 1159517, filed Oct. 20, 2011 (With English Translation of Category of Cited Documents).

* cited by examiner

*Primary Examiner* — Benjamin C Lee
*Assistant Examiner* — Chico A Foxx
(74) *Attorney, Agent, or Firm* — Oblon, McClelland, Maier & Neustadt, L.L.P.

(57) ABSTRACT

A detection device designed to detect the intensity of a signal emitted by a source powered by pulse-width modulation at a first frequency. The device includes a reactivation circuit including circuitry for detecting a signal modulated at a second frequency, the second frequency being different from the first frequency and tripping circuitry or tripping a reactivation of the detection device when the signal is modulated at the second frequency.

7 Claims, 1 Drawing Sheet

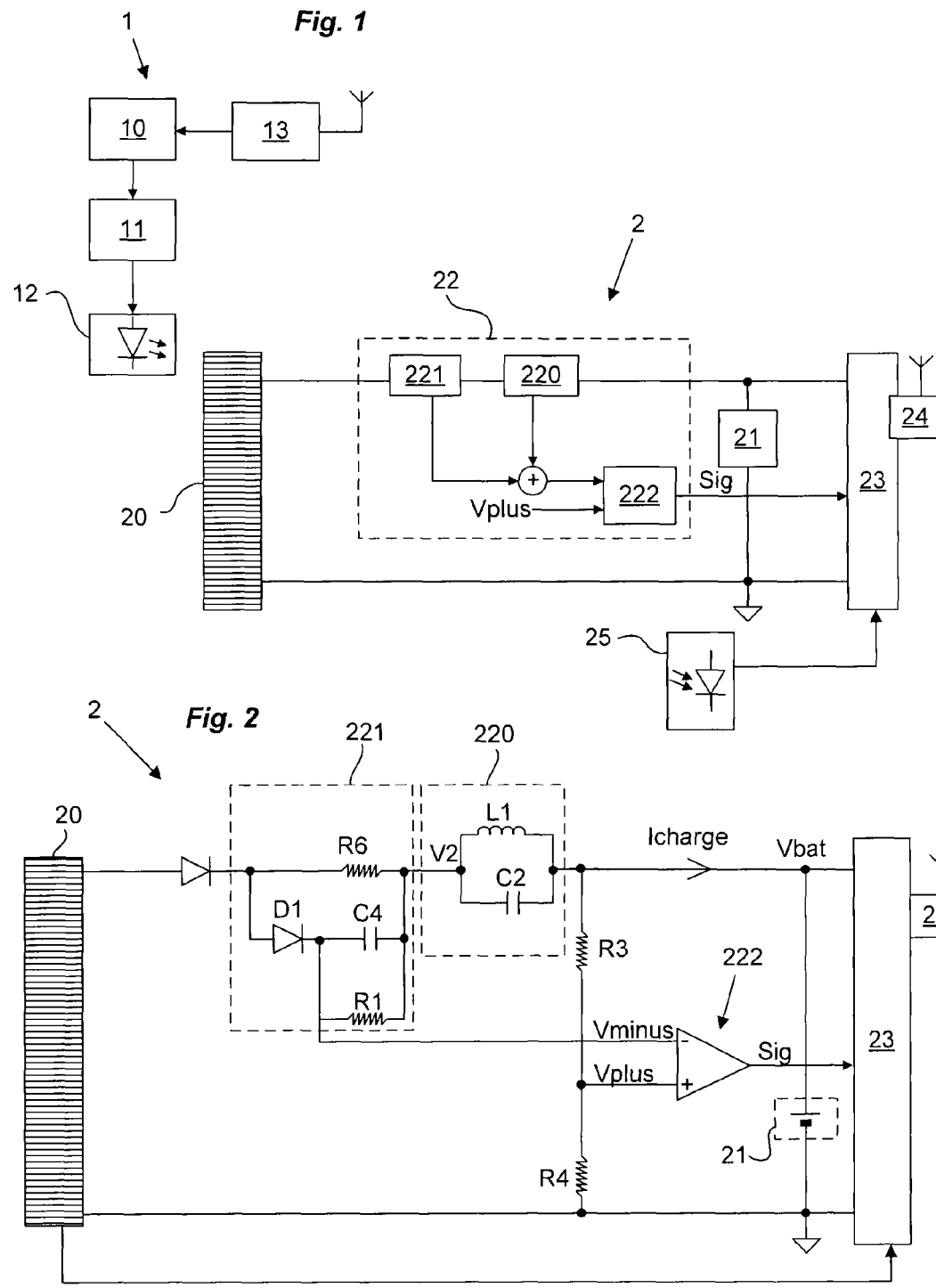

WIRELESS DETECTION DEVICE

The present invention relates to a wireless detection device. This detection device is, for example, employed to detect the light intensity in a variable electronic lighting system such as, for example, a variable lighting system with light-emitting diodes or with fluorescent lamps.

Some variable lighting systems with light-emitting diodes or with fluorescent lamps comprise a light source and a control device consisting of a dimmer intended to control the light intensity supplied by the light source. The control device powers the light source by a pulse-width modulation set to a modulation frequency.

The feedback information to the control device concerning the actual light intensity level is produced using a wireless brightness detection device, placed in the lit area.

Generally, the wireless detection devices which are powered by a local energy source, such as a button cell or a standalone energy generator (photovoltaic, thermoelectric, piezoelectric, etc.), cannot, to limit their energy consumption, measure and transmit measured values continuously. In practice, to reduce their energy consumption, they sample and periodically transmit the measured values. It is therefore the detection device which decides on the times of transmission of the measured values. However, this mode of operation is unsuited to the control of lighting which requires continuous measurements when the level of brightness is being adjusted. Consequently, provision has to be made for the control device to be able to reactivate the brightness detection device when necessary.

A brightness sensor is known from the document US2004/206609.

To reactivate a detection device asynchronously, it is, for example, known from the document referenced US2008/272826 to control a modification of the fundamental frequency of the signal picked up by the detection device. The detection device detects the change of frequency of the signal that it receives and is reactivated to measure and transmit values to the control device. In practice, in the field of lighting by light-emitting diodes, simply modifying the fundamental frequency of the light signal emitted does not bring about a change in the level of lighting. This method for reactivating the detection device is therefore perfectly suited to the field of lighting, because it is transparent to the users.

However, this document involves powering components to detect the change of frequency. Now, when the detection device employs a standalone energy generator, it has to be able to be reactivated asynchronously without consuming too much energy.

The aim of the invention is therefore to propose a wireless detection device that can be reactivated asynchronously while consuming little energy.

This aim is achieved by a detection device designed to detect the intensity of a signal emitted by a source, said source being powered by pulse-width modulation at a first frequency, said device comprising:
   a standalone energy generator supplying a charging current,
   electrical energy storage means powered by the charging current supplied by the standalone energy generator,
   a sensor designed to generate measurement values,
   a reactivation circuit for the detection device, said reactivation circuit comprising tripping means for tripping a reactivation of the detection device when the signal is modulated at a second frequency, different from the first frequency,
   the reactivation circuit being connected to the standalone energy generator and the tripping means receiving as input a voltage that is a function of the charging current generated by the standalone energy generator.

According to the invention, the device also comprises means for detecting the signal modulated at the second frequency, said detection means comprising a resonant circuit.

Furthermore, it is essential to ensure that the detection device is not reactivated unnecessarily. This is particularly true when the device is wireless and powered by a standalone energy generator. In this case, its energy consumption must be as low as possible and any false reactivation of the device is pointless energy consumption.

For this purpose, the device comprises a circuit for eliminating false reactivations, said false reactivations being due to a single variation in the intensity of the signal and/or to a modification of the duty cycle of the pulse-width modulation.

According to a particular feature, the circuit for eliminating false reactivations of the detection device comprises a rectifier circuit designed to detect a maximum amplitude of the charging current.

According to the invention, the tripping means comprise a comparator with two inputs each of which has an electrical potential applied to it.

According to the invention, the first input of the comparator is connected to the rectifier circuit to receive a voltage equal to the sum of the voltage measured at the terminals of the resonant circuit and of the voltage measured at the terminals of the rectifier circuit, and the second input of the comparator is connected to a reference voltage representative of the voltage at the terminals of the energy storage means.

According to the invention, the standalone energy generator comprises a photovoltaic module and the sensor is, for example, a brightness sensor.

The invention also relates to a communication system comprising:
   a coordinator provided with a source of a signal modulated at a first frequency by pulse-width modulation,
   detection devices connected to the coordinator via a communication network,
   each detection device conforming to that defined above, said source comprising means for emitting the signal modulated at a second frequency in order to reactivate the devices and synchronise them.

Other features and advantages will emerge from the following detailed description by referring to an embodiment given by way of example and represented by the appended drawings in which:

FIG. 1 represents a variable lighting system comprising a wireless detection device conforming to the invention.

FIG. 2 shows a detailed representation of a wireless detection device conforming to the invention.

The invention relates to a wireless detection device employed to detect the intensity of a signal emitted by a source and modulated by pulse-width modulation. Said signal is employed to reactivate the detection device.

It may be, for example, a brightness detection device or a temperature detection device. Preferentially, the received signal is identical to the one which is employed by the detection device to generate measurement values. Such is, for example, the case in a brightness detection device which will be reactivated by a modification of the frequency of the light signal emitted by the light source. On the other hand, a temperature sensor will, for example, be reactivated by a modification of the frequency of the vibrations of the support on which the sensor is fixed.

Obviously, the principle of the invention described below can be applied to any type of detection device capable of receiving a signal for which the frequency can be modulated by pulse-width modulation.

Hereinafter in the description, and in the drawings, the detection device of the invention is, for example, employed to detect the light intensity in a variable lighting system with light-emitting diodes or with fluorescent lamps. The references indicated in the drawings apply in the same way to the detection device considered generally.

Referring to FIG. 1, a variable electronic lighting system comprises a control device 1 comprising a lighting controller 10 which is designed to generate a command to an electrical power source 11 based on a light intensity setpoint and on a measured light intensity value. The electrical power source 11 is arranged to power a light source 12, consisting, for example, of one or more light-emitting diodes, by taking account of the command received. The light source 12 is powered by pulse-width modulation, for example at a first modulation frequency $f_0$ or at a second modulation frequency $f_1$. The light source 12 therefore emits a pulsed light signal at the same modulation frequency.

The light intensity is measured by a wireless brightness detection device 2 capable of measuring the light intensity at regular intervals and of sending the measured values by wireless link to the control device.

The brightness detection device 2 comprises a standalone energy generator 20 such as a photovoltaic, piezoelectric or electromagnetic module designed to generate a charging current Icharge. As represented in the figures, the standalone energy generator 20 is a photovoltaic module designed to generate the charging current Icharge as a function of the intensity of the light signal received. The device also comprises means 21 for storing the electrical energy recovered using the standalone energy generator 20, consisting, for example, of one or more capacitors or of a battery.

The brightness detection device also comprises a brightness sensor 25 comprising an element which is sensitive to the brightness in order to pick up the light intensity and convert it into an electrical current representative of said light intensity and processing means 23 designed to generate the light intensity values to be sent.

According to the invention, the brightness detection device 2 comprises a reactivation circuit 22 enabling it to be reactivated asynchronously by the control device 1. The reactivation circuit 22 comprises means 220 for detecting a light signal modulated at the second frequency $f_1$, different from the first frequency $f_0$, and tripping means 222 making it possible to reactivate the device asynchronously when the detection means 220 detect that the modulation frequency of the light signal emitted is at the second frequency $f_1$. The reactivation circuit also comprises a circuit 221 for eliminating false reactivations, the objective of which will be explained below.

The device finally comprises a radio transmitter 24 controlled by the processing means 23 and capable of sending, by radio message, said measured light intensity values to a radio receiver 13 of the control device.

The principle of the invention consists in detecting the change of the modulation frequency from the charging current Icharge generated by the standalone energy generator 20. Since the standalone energy generator 20 is always exposed to the light in order to be able to charge the device, the latter can easily be employed to control the reactivation circuit 22 of the device.

An exemplary embodiment of the brightness detection device is described more specifically in FIG. 2.

In FIG. 2, the standalone energy generator 20 comprises a photovoltaic module. In FIG. 2, the photovoltaic module is, for example, employed also to perform the function of the brightness sensor 25 defined above and it makes it possible to generate the charging current Icharge as a function of the intensity of the light signal received. The electrical energy storage means 21 comprise, for example, a battery connected to the photovoltaic module.

The detection means 220 of the reactivation circuit 22 comprise a resonant circuit designed to detect the modulation at the second frequency of the light signal. The resonant circuit is, for example, of LC type (inductor L1 and capacitor C2), tuned to resonate at the second frequency $f_1$, and connected in series to the charging circuit of the battery 210. The circuit 221 for eliminating false reactivations comprises a rectifier circuit connected in series with the resonant circuit and designed to rectify the charging current Icharge in order to detect its amplitude. More specifically, the rectifier circuit comprises a resistor R6 connected in series to the charging circuit and an assembly connected in parallel with the resistor R6 and consisting of a diode D1, a capacitor C4 and a resistor R1. The resistor R1 and the capacitor C4 are connected in parallel and the assembly that they form is connected in series with the diode D1.

The tripping means 222 comprise a comparator with two inputs, the first input of which is connected to the rectifier circuit (at the common point of connection of the resistor R1, of the capacitor C4 and of the diode D1) so as to receive a voltage Vminus resulting from the voltage V2 at the terminals of the resonant circuit and voltage representative of the amplitude of the charging current Icharge, and the second input of which is connected, via a resistor bridge R3, R4, to the terminals of the battery 210 to receive a voltage representative of the voltage Vbat at the terminals of the battery. The comparator also comprises an output which is activated when the voltage applied to its first input changes to a negative value relative to the voltage applied to its second input. The output signal Sig which is thus generated is applied to the processing means 23 of the device to reactivate the brightness detection device.

By virtue of the rectifier circuit described above, the device is thus equipped to manage false reactivations. The false reactivations of the brightness detection device may occur when the modulus of the harmonic at the second frequency $f_1$ of the charging current Icharge is modified. This can happen in the following two cases:
1) by modification of the light intensity, without changing the frequency spectrum. This can occur if the detection device is moved relative to the light source,
2) by modification of the duty cycle of the pulse-width modulation. This can occur if the control device 1 sends a command to modify the intensity of the light signal.

To immunise the device against false reactivations, the rectifier circuit corrects the voltage Vminus applied to the first input of the comparator. By virtue of the rectifier circuit, an increase in the amplitude of the voltage at the terminals of the resonant circuit is automatically accompanied by a proportional raising of a positive DC component represented by the voltage at the terminals of the rectifier circuit. Even in one of the two cases described above, the voltage Vminus will not change to a negative value relative to the reference voltage Vplus and therefore the output of the comparator will not be activated. For this, the rectifier circuit comprises a resistor R6, the value of which is set according to the second frequency.

The voltage Vminus applied to the first input of the comparator is therefore:

$$V\text{minus} = V2 + I\text{charge\_peak} * R6$$

The principle of operation of the brightness detection device of the invention is thus as follows:

initially, the light signal is modulated by the pulse-width modulation at the first frequency $f_0$). The photovoltaic module charges the battery 210 with a charging current Icharge proportional to the intensity of the instantaneous light signal. The charging current Icharge varies between a peak value and a value equal to zero. The voltage Vminus remains more positive than the voltage Vplus and the device remains on standby.

When the light signal is modulated by the pulse-width modulation at the second frequency $f_1$, the charging current Icharge generated by the photovoltaic module will oscillate at a fundamental frequency equal to the second frequency $f_1$. The resonant circuit tuned to the second frequency $f_1$ will then begin to resonate. By oscillating, the voltage at the terminals of the resonant circuit will periodically change to a negative value relative to the voltage Vbat at the terminals of the battery. If a sufficiently negative peak occurs, the output of the comparator is activated, the signal Sig being generated to bring about the reactivation of the device and of its measurement function.

On the other hand, if the intensity of the light signal changes (by action on the control device or movement of the device relative to the light source) while remaining at the first frequency $f_0$, the tripping threshold of the output of the comparator is modified by the level of the charging current Icharge which passes through the rectifier circuit. Even if the charging current Icharge includes a harmonic modulated at the second frequency $f_1$, this will not result in a reactivation of the device because this harmonic will remain negligible. The output of the comparator will therefore be activated only upon a significant appearance of the harmonic modulated at the second frequency $f_1$ relative to its peak value.

The wireless brightness detection device of the invention therefore exhibits a particularly low electrical consumption which is limited to the consumption of the comparator and to that of the resistors R3 and R4. The asynchronous reactivation function implemented in the device of the invention therefore has only a small influence on the energy autonomy of the device.

If a number of brightness detection devices are connected through a communication network, the reactivation technique described above makes it possible to synchronise all the devices with one another. Thus, each device can know at what time it can transmit information over the network and is not therefore forced to continue listening permanently. The reactivation synchronised by the technique described can increase the reactivity and shorten the response time of the wireless networks operating in "beacon" mode, such as "wirelessHART" or "beacon enabled IEEE 802.15.4". In this type of wireless network, all the devices (including the coordinator) operate independently. On the other hand, to communicate over the network, the devices must know at what time they have to be reactivated to transmit. For this, it is necessary for them to be synchronised relative to the reactivation of the coordinator (or of a router). Upon the reception of a beacon, all the devices are informed of the duration of the period of activity of the coordinator and at what time they can transmit data. They also will receive an indication of the moment when the coordinator enters into hibernation mode and for how long.

The invention claimed is:

1. A wireless brightness detection device for detecting the intensity of a light output signal emitted by a light source controlled by a control device and for providing feedback information to the control device concerning actual light intensity levels of said light source for further control adjustment of the light source, said light source being powered by pulse-width modulation at a first frequency and at a second frequency different from the first frequency selectively, said device comprising:

a standalone energy generator supplying a charging current converted from said signal of either said first frequency or said second frequency;

electrical energy storage means for receiving and storing the charging current supplied by the standalone energy generator;

a sensor designed to generate light intensity measurement values of said signal to provide said feedback information, wherein said wireless brightness detection device is in a standby mode when receiving said light output signal at said first frequency; and a reactivation circuit connected to the standalone energy generator to reactivate the sensor to provide said feedback information to the control device, comprising, signal detecting means including a resonant circuit for detecting the signal pulse-width modulated at the second frequency different from the first frequency;

tripping means connected to the signal detecting means for tripping a reactivation of the detection device when the signal detected by the signal detecting means is pulse-width modulated at the second frequency different from tile first frequency, said tripping means receiving as input a voltage that is a function of the charging current generated by the standalone energy generator, and means for eliminating false reactivations, said false reactivations being due to a single variation of the intensity of the signal and/or to a modification of the duty cycle of the pulse-width modulation.

2. Device according to claim 1, wherein the means for eliminating false reactivations of the detection device comprises a rectifier circuit designed to detect a maximum amplitude of the charging current.

3. Device according to claim 2, wherein the tripping means comprise a comparator with two inputs each of which has an electrical potential applied to it.

4. Device according to claim 3, wherein the first input of the comparator is connected to the rectifier circuit to receive a voltage equal to the sum of the voltage measured at the terminals of the resonant circuit and of the voltage measured at the terminals of the rectifier circuit and in that the second input of the comparator is connected to a reference voltage representative of the voltage at the terminals of the energy storage means.

5. Device according to claim 1, wherein the standalone energy generator comprises a photovoltaic module configured to also function as the sensor.

6. Device according to claims 1, wherein the sensor is a brightness sensor.

7. Communication system comprising:

a coordinator provided with a source of a signal modulated at a first frequency or at a second frequency different from the first frequency by pulse-width modulation, said source being a light source;

a plurality of wireless brightness detection devices for detecting the intensity of a light output signal emitted by the light source connected to said coordinator via a communication network, wherein each wireless brightness detection device provides feedback information to the coordinator concerning actual light intensity levels for further control adjustment of the light source, each wireless brightness detection device comprises:

a standalone energy generator supplying a charging current signal converted from either said first frequency or said second frequency;

electrical energy storage means for receiving and storing the charging current supplied by the standalone energy generator;

a sensor designed to generate light intensity measurement values of said signal to provide said feedback information, wherein said wireless brightness detection device is in a standby mode when receiving said light output signal at said first frequency; and a reactivation circuit connected to the standalone energy generator to reactivate the sensor to provide said feedback information to a control device, comprising, signal detecting means including a resonant circuit for detecting the signal pulse-width modulated at the second frequency different from the first frequency;

tripping means connected to the signal detecting means for tripping a reactivation of the detection device when the signal detected by the signal detecting means is pulse-width modulated at the second frequency different from tile first frequency said tripping means receiving as input a voltage that is a function of the charging current generated by the standalone energy generator, and means for eliminating false reactivations, said false reactivations being due to a single variation of the intensity of the signal and/or to a modification of the duty cycle of the pulse-width modulation.

* * * * *